US008824464B2

(12) United States Patent
Nadeau et al.

(10) Patent No.: US 8,824,464 B2
(45) Date of Patent: Sep. 2, 2014

(54) TECHNIQUES FOR DISTRIBUTING NETWORK PROVIDER DIGITAL CONTENT TO CUSTOMER PREMISES NODES

(75) Inventors: Thomas David Nadeau, Hampton, NJ (US); William Mark Townsley, Nashville, TN (US)

(73) Assignee: Cisco Technology, Inc., San Jose, CA (US)

(*) Notice: Subject to any disclaimer, the term of this patent is extended or adjusted under 35 U.S.C. 154(b) by 161 days.

(21) Appl. No.: 13/157,160

(22) Filed: Jun. 9, 2011

(65) Prior Publication Data
US 2011/0238791 A1 Sep. 29, 2011

Related U.S. Application Data

(63) Continuation of application No. 11/286,453, filed on Nov. 25, 2005, now Pat. No. 7,986,686.

(51) Int. Cl.
*G06F 15/173* (2006.01)
*H04L 12/50* (2006.01)
(52) U.S. Cl.
USPC .......................................... 370/386; 709/226
(58) Field of Classification Search
USPC ................................. 370/386; 709/226, 227
See application file for complete search history.

(56) References Cited

U.S. PATENT DOCUMENTS

| | | | |
|---|---|---|---|
| 5,612,897 A | 3/1997 | Rege | |
| 6,167,496 A | 12/2000 | Fechner | |
| 6,430,275 B1 | 8/2002 | Voit | |
| 6,438,596 B1 | 8/2002 | Ueno | |
| 6,473,902 B1 | 10/2002 | Noritomi | |
| 6,526,225 B1 | 2/2003 | Windrem | |
| 6,772,193 B1 | 8/2004 | Igawa | |
| 6,801,944 B2 | 10/2004 | Motoyama | |
| 6,834,110 B1 | 12/2004 | Marconcini | |
| 6,839,340 B1 | 1/2005 | Voit | |

(Continued)

FOREIGN PATENT DOCUMENTS

| | | |
|---|---|---|
| EP | 1231790 A2 | 8/2002 |
| GB | 2412279 A | 9/2005 |
| WO | WO 01/01025 | 1/2001 |
| WO | WO 01/10125 A1 | 2/2001 |

OTHER PUBLICATIONS eMule-Project.net, "Official eMule Homepage—Welcome," May 13, 2002, http://www.emule-project.net/home/perl/general.cgi?l=1.

(Continued)

*Primary Examiner* — Afshawn Towfighi
(74) *Attorney, Agent, or Firm* — Leon R. Turkevich

(57) ABSTRACT

Techniques for distributing digital content include receiving provider content over a network connection at a customer premises node located on premises of a first customer. The provider content is offered by a network service provider different from the first customer. Provider data based on the provider content is stored in non-volatile storage on the customer premises node of the first customer. It is determined whether conditions are satisfied for sending the provider content to a second customer different from the first customer. If it is determined that such conditions are satisfied, then the provider data is retrieved from the non-volatile storage, and data based on the provider data is sent over the network connection for receipt by the second customer. Thereby a customer premises node serves as a cache of provider content for other customer premises nodes on the same last mile segment or access network.

20 Claims, 5 Drawing Sheets

(56) References Cited

U.S. PATENT DOCUMENTS

| | | | |
|---|---|---|---|
| 6,862,625 | B1 | 3/2005 | Busey |
| 7,024,466 | B2 | 4/2006 | Outten |
| 7,080,400 | B1 | 7/2006 | Navar |
| 7,450,930 | B2 | 11/2008 | Williams |
| 2002/0010759 | A1 | 1/2002 | Hitson |
| 2002/0026442 | A1 | 2/2002 | Lipscomb |
| 2002/0059623 | A1 | 5/2002 | Rodriguez |
| 2003/0158958 | A1 | 8/2003 | Chiu |
| 2003/0182429 | A1* | 9/2003 | Jagels .......................... 709/227 |
| 2003/0204602 | A1 | 10/2003 | Hudson |
| 2003/0204856 | A1 | 10/2003 | Buxton |
| 2005/0256770 | A1 | 11/2005 | Popkin |
| 2005/0268102 | A1 | 12/2005 | Downy |
| 2006/0021057 | A1* | 1/2006 | Risan et al. ..................... 726/26 |
| 2006/0044975 | A1 | 3/2006 | Miyake |

OTHER PUBLICATIONS

Russ et al., Broadcast Carousel System Access for Remote Home Communication Terminal. U.S. Appl. No. 10/235,201, United States Patent Application Publication. Mar. 11, 2004. vol. 2004, No. 0049790, Publisher: United Sates Patent and Trademark Office, Published in: Washington, DC.

Cable Television Laboratories, Inc., "Data-Over-Cable Service Interface Specification DOCSIS 1.1—Operations Support system Interface Specification—CM-SP-OSSIv1.1-C01-050907," Sep. 7, 2005.

Cable Television Laboratories, Inc., "Data-Over-Cable Service Interface Specification DOCSIS 1.1—Radio Frequency Interface Specification—CM-SP-RFIv1.1-C01-050907," Sep. 7, 2005.

TiVo Inc. "TiVo HD DVR," Jun. 5, 2007.

International Searching Authority, International Search Report for PCT/US2006/0060686, May 19, 2008, 5 pages.

Cable Television Laboratories, Inc., "Data-Over-Cable Service Interface Specification—Baseline Privacy Plus Interface Specification—CM-SP-BP1+-C01-081104," Nov. 4, 2008.

OldVersion.com, "Download Kazaa," http://www.oldversion.com/Kazaa.html, Jan. 2009.

European Search Report for PCT/US2006/0060686; Aug. 18, 2010; 11 pages.

Wikipedia.org, "FastTrack," http://en.wikipedia.org/wiki/FastTrack, last modified Nov. 20, 2010.

BitTorrent, Inc., "A Beginner's Guide to BitTorrent," Jan. 2011, http://www.utorrent.com/documentation/beginners-guide.

BitTorrent, Inc., "uTorrent Connection Setup Guide," Jan. 2011, http://www.utorrent.com/documentation/connection-setup.

BitTorrent, Inc., "uTorrent WebUI Guide," Jan. 2011, http://www.utorrent.com/documentation/webui.

Wikipedia.org, "Kazaa," http://en.wikipedia.org/wiki/Kazaa, last modified Jan. 16, 2011.

* cited by examiner

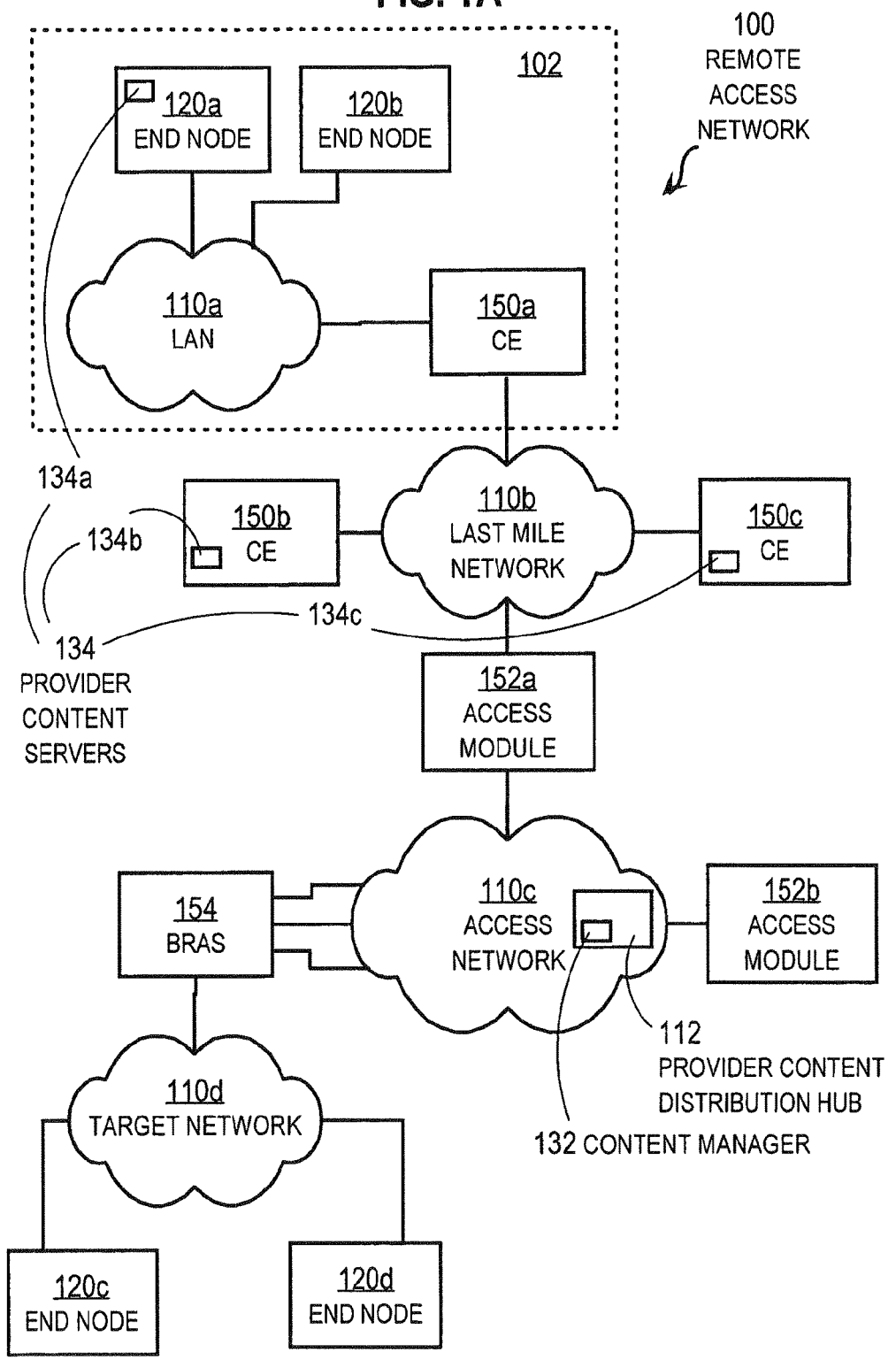

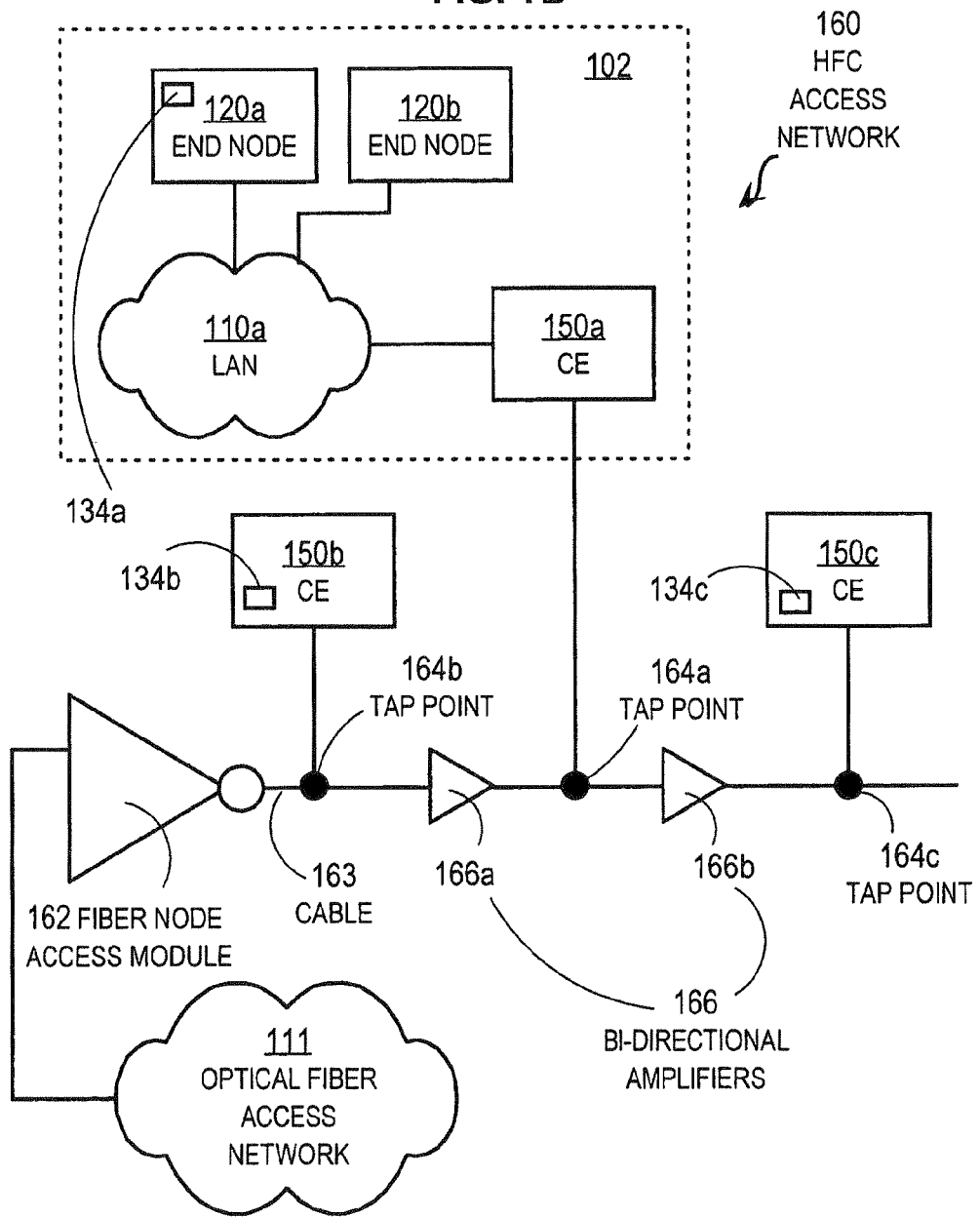

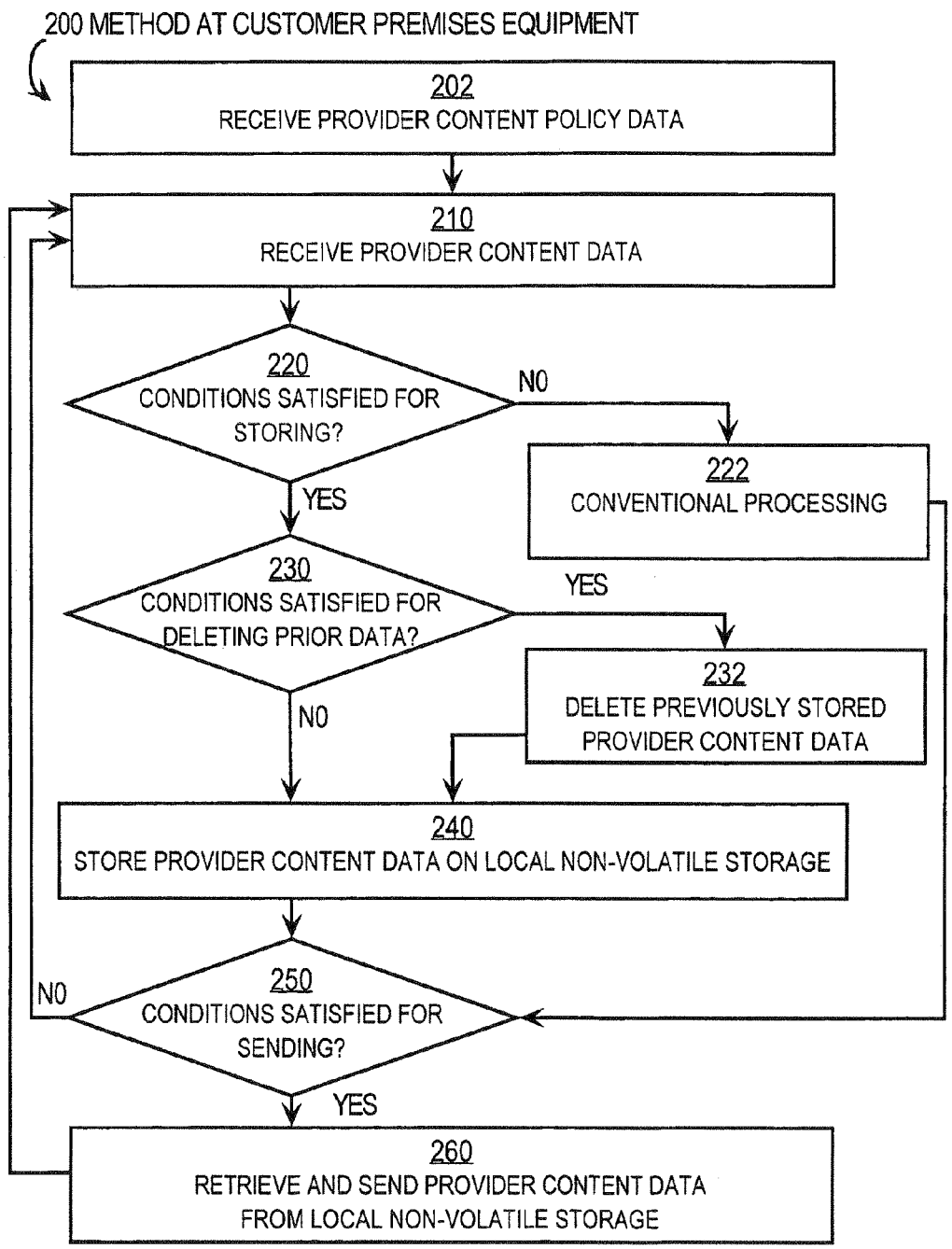

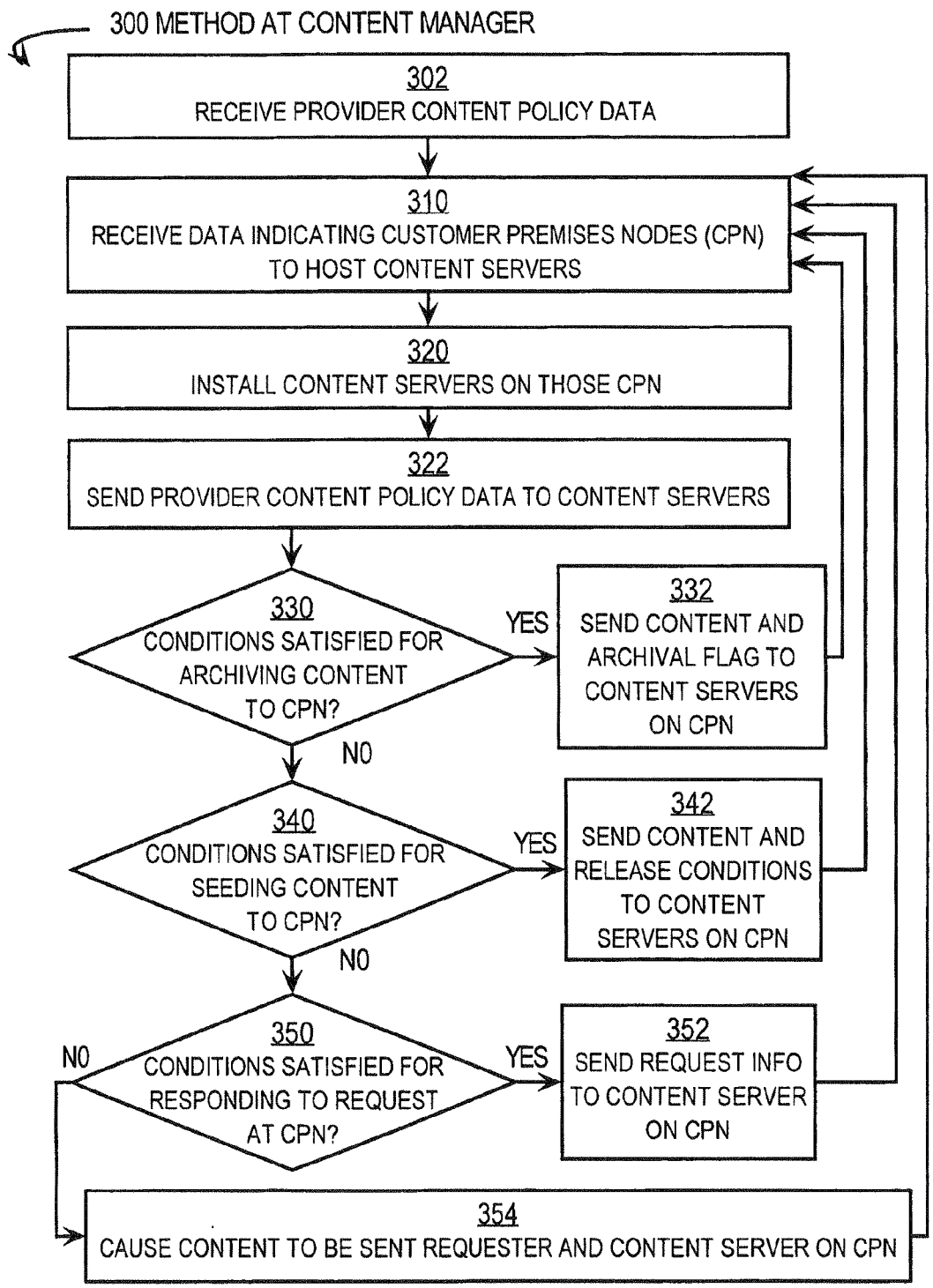

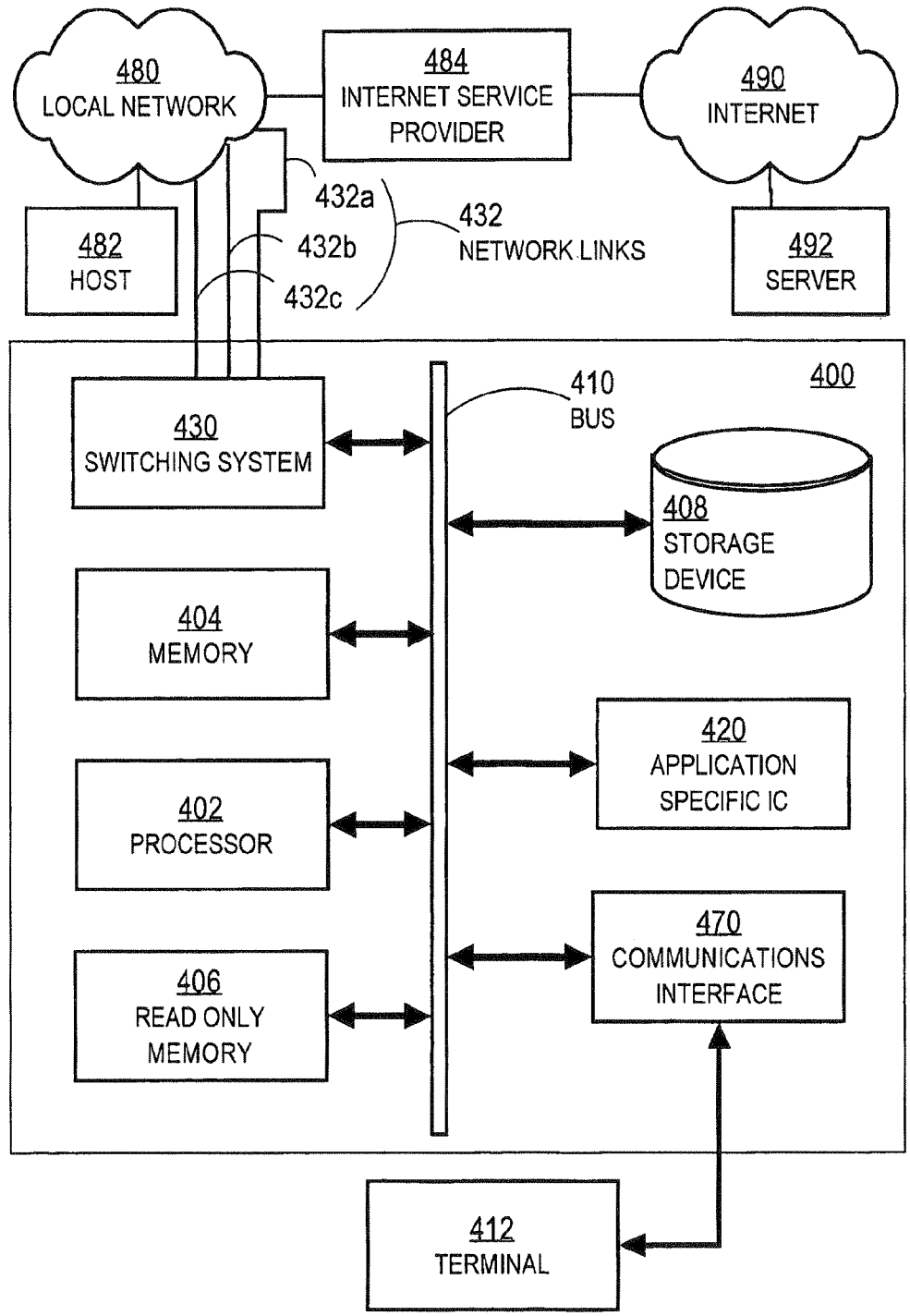

TECHNIQUES FOR DISTRIBUTING NETWORK PROVIDER DIGITAL CONTENT TO CUSTOMER PREMISES NODES

This application is a continuation of U.S. patent application Ser. No. 11/286,453 filed Nov. 25, 2005 now U.S. Pat. No. 7,986,686, titled "TECHNIQUES FOR DISTRIBUTING NETWORK PROVIDER DIGITAL CONTENT TO CUSTOMER PREMISES NODES", the disclosure of which is incorporated herein by reference in its entirety.

BACKGROUND OF THE INVENTION

1. Field of the Invention

The present invention relates to distributing network provider digital content more closely to customer premises to reduce the consumption of network resources; and, in particular, to installing content servers on customer premises nodes to move content even closer to customers of that content and to consume even fewer network resources, without an increase in infrastructure costs to the network service provider.

2. Description of the Related Art

Popular large digital content includes video, audio and imagery such as cable broadcast video (television) and audio (radio), on demand video and audio, and popular web pages. The delivery of such content to hundreds of thousands and millions of viewers consumes considerable network resources and can tax the available resources on existing network infrastructure. To reduce the load on network infrastructure, network administrators distribute popular content among several distribution centers strategically placed close to digital content consumers. This reduces the number of communication links the digital data must traverse and therefore conserves network resources. This also reduces the time between request and delivery of data. However, this also increases the cost of content storage because the same content must be stored multiple times. An advantage of this approach is that valuable content is replicated at the distribution centers and readily available for recovering from equipment failure at one or more other distribution centers.

Today, cable video networks utilize a media distribution mechanism that relies on the use of broadcasting all available channels simultaneously over different frequencies. Newer video-on-demand and IP-based video distribution systems still utilize a client-server model, whereby content is served from one or more servers in direct communication with a set-top box (STB) or personal computer (PC). Some servers utilize a multi-cast model whereby data streams are transmitted to fewer than all customers on the network. As with cable video data, Internet traffic is often served via well-placed servers which cache recent high-demand web content. The servers are distributed around the service provider's access network as close as reasonable to the customer equipment, while balancing the costs of maintaining the extra servers. These caches, distributed content servers, etc. push the content closer to the user which is receiving the data, yielding more efficient network utilization and faster interaction with the user.

While suitable for many purposes, the approach of moving content servers and caches closer to customer sites is that the same data is still stored and distributed multiple times. Multiple storage and distribution occurs even in the case where multicast streams are used to reduce the number of individual flows. The extra storage involves extra hardware at one or more servers or extra servers compared to more centralized content servers.

The extra costs are likely to worsen with time. Requirements for distribution of high definition television (HDTV) signals, voice for both residential and business customers, and ever faster data services, will continue to force service providers to consider more efficient approaches for content distribution.

Based on the foregoing, there is a clear need for techniques that provide the benefits of distributed content servers without suffering all the disadvantages of prior art approaches. In particular, there is need for reducing consumption of scarce network resources of a service provider without bearing all the costs of increased storage centers.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram that illustrates a remote access network that distributes provider content, according to an embodiment;

FIG. 1B is a block diagram that illustrates a portion of a Hybrid optical Fiber, Coaxial cable (HFC) access network, according to an embodiment;

FIG. 2 is a flow diagram that illustrates at a high level a method for a content server on a customer premises node that distributes network provider content, according to an embodiment;

FIG. 3 is a flow diagram that illustrates at a high level a method for a content manager on a provider network that orchestrates content servers on customer premises nodes, according to an embodiment; and FIG. 4 is a block diagram that illustrates a router upon which an embodiment of the invention may be implemented.

DETAILED DESCRIPTION

Techniques are described for distributing digital content. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following, embodiments of the invention are described in the context of distributing television video content to customer premises nodes, such as personal computers (PCs) and set top boxes (STBs), connected by a hybrid optical fiber coaxial cable (HFC) access network to the public Internet of heterogeneous subnetworks. However, the invention is not limited to this context. In other embodiments, the customer premises node includes the same or other devices, such as laptop computers, cable-ready televisions, Internet-ready televisions, game consoles, personal digital assistants, and cell phones, alone or in some combination. In various other embodiments, the provider content is audio, voice, images and Web pages, game data, shared application data, or some combination. Some other embodiments involve other broadband access networks, including Ethernet twisted pair, digital subscriber line (DSL), short range wireless (WiFi, subject to the International Electrical and Electronics Engineers, IEEE, standard 802.11), and metropolitan area (MAN, IEEE standard 802.16) access networks, alone or in combination.

1.0 Functional Overview

According to various embodiments of the invention, content servers for distributing network service provider content are deployed on customer premises nodes with a network link, a processing unit and non-volatile storage. Many such devices are already widely deployed on current access networks. For example, in cable networks that reach many residences in metropolitan and suburban areas, such devices include digital video recorders (DVRs) such as TIVO™ from TiVo, Inc. of Alviso, Calif. and video recorders offered by Comcast Corp. of Philadelphia, Pa. using devices from Motorola, Inc. of Schaumburg, Ill., personal computers, and game consoles. Many of these devices already include software to request and receive video content and store them for later use on the device.

The content servers of the illustrated embodiments provide extra functions that cache provider content for redistribution to other devices connected to the same cable access network. In essence, each such device becomes a content cache for neighboring devices. Such caches are especially efficient for redistributing high value content to other devices on the same local area network and on the same neighborhood cable loop. Typically, the provider content is received in the normal course of presenting the content on the device, or a display unit in communication with the device. In addition, in various embodiments, these content servers store provider content (temporarily or permanently on fixed media) specially delivered at one time for propagating at a later time in unicast or broadcast messages on one or more network segments in their neighborhood or elsewhere on the access or core network.

These content servers consume processing and storage resources on customer premises nodes that would otherwise be lightly used, and save the network provider from the cost of the hardware to provide the equivalent processing and storage resources.

2.0 Network Overview

Networks of general purpose and application specific computer systems and other devices, such as personal digital assistants, cell phones and appliances, connected by external communication links are well known. The networks often include one or more network devices that facilitate the passage of information between the computer systems and other devices. A network node is a network device or computer system or other device connected by the communication links.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model and Internet architecture is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, usually higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

The client-server model of computer process interaction is also widely known and used. According to the client-server model, a client process sends a message including a request to a server process, and the server process responds by providing a service. The server process may also return a message with a response to the client process. Often the client process and server process execute on different devices, called hosts, and communicate via a network using one or more protocols for network communications. The term "server" is conventionally used to refer to the process that provides the service, or the host on which the process operates. Similarly, the term "client" is conventionally used to refer to the process that makes the request, or the host on which the process operates. As used herein, the terms "client" and "server" refer to the processes, rather than the hosts, unless otherwise clear from the context. In addition, the process performed by a server can be broken up to run as multiple processes on multiple hosts (sometimes called tiers) for reasons that include reliability, scalability, and redundancy.

FIG. 1A is a block diagram that illustrates a remote access network 100 that distributes provider content, according to an embodiment. A computer network is a geographically distributed collection of interconnected sub-networks (e.g., sub-networks 110a, 110b, 110c, 110d collectively referenced hereinafter as sub-networks 110) for transporting data between nodes, such as computers. A local area network (LAN) 110a is an example of such a sub-network. The network's topology is defined by an arrangement of end nodes (e.g., end nodes 120a, 120b, 120c, 120d, collectively referenced hereinafter as end nodes 120) that communicate with one another, typically through one or more intermediate network nodes, such as a router or switch, that facilitates routing data between end nodes 120 on different sub-networks. As used herein, an end node 120 is a node that is configured to originate or terminate communications over the network. In contrast, an intermediate network node facilitates the passage of data between end nodes. Intermediate network nodes depicted in FIG. 1A include customer premises edge nodes (CD) 150a, 150b, 150c, access modules 152a, 152b, and Broadband Remote Access Server (BRAS) node 154.

Four sub-networks 110 that are typically involved in remote access are depicted in FIG. 1A. Each sub-network 110 may include zero or more intermediate network nodes. A target network 110d, such as a network using the Internet Protocol (IP), is the objective for remote access by users at a remote site 102.

To access target network 110d, a LAN 110a is connected to CE 150a which serves as a bridge to a sub-network 110b which connects multiple sites in a neighborhood, sometimes called a "last mile," and thus sub-network 110b is labeled the last mile network 110b in FIG. 1A. In an illustrated embodiment, LAN 110a uses Ethernet infrastructure. Although the remote site 102 includes an Ethernet LAN 110a and two end nodes 120a, 120b, in other embodiments more or fewer end nodes 120 are connected to more or fewer or different LANs 110, such as one or more LANs using Asynchronous Transfer Mode (ATM) infrastructure.

In some embodiments, CE is a telephone modem using acoustic frequency electronic signals over a low-bandwidth legacy telephone system. In some embodiment, CE 150a is a digital subscriber line (DSL) modem for establishing a high bandwidth DSL connection over the telephone wire network as the last mile network 110b. In some embodiments CE is a set top box (STB) that receives signals from a cable last mile network 110b and selects a signal to display on a television set or to record on an analog or digital video recorder. In an illustrated embodiment, CE 150a is a cable modem for establishing a high bandwidth cable connection over a coaxial cable network segment as the last mile network 110b. In other embodiments, sub-network 110b is replaced by another network with wide availability for remote sites, such as a network built on optical cable or a wireless network. In such embodiments, CE 150a is an optical modem or wireless network interface card for establishing a high bandwidth optical or wireless connection over the sub-network 110b. In an illustrated embodiment, the protocol used for communications over last mile network 110b is IP.

As described in more detail below, according to embodiments of the invention, a server for provider content, called herein a "provider-content server," 134 executes on one or more network nodes on the customer premises (called herein "customer premises nodes"), such as intermediate network node CE 150a, 150b, 150c, intermediate nodes on customer premises LAN, e.g., LAN 110a, and customer site end node, e.g., 120a, 120b. For purposes of illustration in FIG. 1A, a provider-content server 134a executes on customer premises end node 120a, provider-content server 134b executes on CE 150b, and provider-content server 134c executes on CE 150c. In other embodiments, more or fewer provider-content servers execute on more or fewer customer premises nodes.

Communications over sub-network 110b from CE 150a, 150b, 150c terminate at access module 152a. Although three CE 150a, 150b are depicted connected to sub-network 110b, in other embodiments more or fewer CE are connected to sub-network 110b. In an illustrated embodiment, access module 152a is a fiber node access module, as described further below with reference to FIG. 1B. In other embodiments, other devices serve as access module 152. For example, in some embodiments, access module 152a is a DSL Access Module (DSLAM). In still other embodiments, access module 152a is a controller for a bank of low-bandwidth modems or an optical or wireless access module.

A service provider (SP) typically maintains several access modules 152a, 152b and an access network 110c for connection to an IP target network 110d through a Broadband Remote Access Server (BRAS) node 154. In many emerging embodiments, the access network 110c uses IP as the communication protocol. In other embodiments, other protocols, such as the Asynchronous Transfer Mode (ATM) or the Multiple Protocol Label Switching (MPLS) are used in access network 110c. In many emerging embodiments, the access network has a physical layer that is a hybrid optical fiber and coaxial cable (HFC) network. Although one access network 110c is depicted in FIG. 1A, in other embodiments more access networks connected by corresponding BRAS to target network 110d are included in remote access network 100.

The access network 110c includes provider content distribution hub 112, which is a server that is located on a host that is close to access modules 152a, 152b for storing popular content. Although one provider-content distribution hub server 112 is depicted in FIG. 1A, in other embodiments more or fewer provider-content distribution hub servers are located in access network 110c or other access networks (not shown).

According to some embodiments of the invention, the provider hub 112 includes a content manager process 132. As described in more detail below, the content manager process 132 controls or supports the operation of the provider-content servers 134 on the customer premises nodes. Although one content manager process 132 within one provider-content distribution hub server 112 on access network 110c is depicted in FIG. 1A, in other embodiments more or fewer content manager processes 132 are included within or external to one or more provider content distribution hubs 112 on access network 110c or other access networks or on target network 110d. In some embodiments, the functions ascribed to the content manager process 132, as described in more detail in a later section, are divided among different processes on the same or different nodes of access network 110c, target network 110d, or some other network (not shown) available through access network 110c or target network 110d.

The service provider (SP) typically offers content that originates at head end servers on target network 110d for delivery to end nodes at customer sites, e.g., end nodes 120a, 120b on LAN 110a. For purposes of illustration, it is assumed that a head end server for particular content that contains a popular digital program or website executes on end node 120d. For example, head end node 120d is connected to a satellite antenna for receiving the popular digital program. There may be many thousands or hundreds of thousands of customers who wish to view that particular content. Based on anticipated or actual demand, the service provider determines that the particular content is popular and is requested by many customers. To avoid sending the same content repeatedly over target network 110d through BRAS 154 and access network 110c to access modules 152a, 152b and thence to end nodes on customer premises, the service provider sends the content once to the provider content distribution hub servers, such as distribution hub server 112 located close to access modules 152a, 152b. The provider content distribution hub server 112 then uses fewer network communication resources to distribute that content to access modules 152a, 152b for customer premises nodes served by those access modules. The distribution of content to a distribution hub 112 within the service provider's premises and facilities is a common approach currently used by service providers.

FIG. 1B is a block diagram that illustrates a portion of a Hybrid optical Fiber, Coaxial cable (HFC) access network 160, according to some embodiments. An HFC network is a telecommunication technology in which optical fiber cable and electrical conducting coaxial cable are used in different portions of a network to carry broadband content (such as video, data, and voice). Using HFC, a local cable television company installs fiber optic cable from a able head-end distribution center to serving nodes located close to access modules directly connected to business and residential users. From the access modules, the cable television company uses coaxial cable to individual businesses and homes. An advantage of HFC is that some of the characteristics of fiber optic cable (high bandwidth and low noise and interference susceptibility) can be brought close to the customer without having to replace the dense mesh of existing coaxial cable that is already installed in the last mile to the customer sites, e.g., to individual homes and businesses. Both cable television and telephone companies are using HFC in new and upgraded networks and, in some cases, sharing the same infrastructure to carry both video and voice conversations in the same system. The use of fiber optic cable for the backbone paths, e.g., in access network 110c, allows more data to be carried than coaxial cable alone and the portion with fiber optic cable is more reliable than coaxial cable.

The illustrated HFC access network 160 includes an optical fiber access network 111 serving as access network 110c, and a fiber node access module 162 serving as access module 152a. As part of the "last mile" in the illustrated embodiment, a coaxial cable 163 extends from the fiber node access module 162 through the neighborhoods with individual homes and businesses. CEs in the individual homes and businesses, e.g., CEs 150a, 150b, 150c, connect to the cable 163 at tap points 164a, 164b, 164c, respectively, collectively referenced hereinafter as tap points 164. Often one or more bi-directional amplifiers 166 are included on the cable 163 to maintain signal amplitudes at effective levels for the extent of the cable 163. As depicted in FIG. 1B, bi-directional amplifiers 166a, 166b are interspersed between tap points 164b, 164a, 164c, respectively. As depicted in FIG. 1B, cable 163, tap points 164, and bi-directional amplifiers 166 constitute the last mile network 110b of FIG. 1A. CEs 150a, 150b, 150c, LAN 110a, end nodes 120a, 120b, and provider-content servers 134a, 134b, 134c are as described in FIG. 1A.

3.0 Method for Distributing Network Provider Content

FIG. 2 is a flow diagram that illustrates at a high level a method 200 for a content server on a customer premises node that redistributes network provider content, according to an embodiment. Although steps are shown in FIG. 2 and FIG. 3 in a particular order for purposes of illustration, in other embodiments steps are performed in a different order or overlapping in time or are omitted or are changed in some combination of ways.

The method of 200 is executed by a process called a provider-content server on any customer premises node, including customer premises edge nodes (CE), other intermediate network nodes on customer premises, such as a node (not shown) in LAN 110a, and on one or more end nodes on customer premises, e.g., end nodes 120a, 120b It is only required that the customer premises node that executes the provider-content server have a network connection, a processor, such as a central processing unit (CPU) and direct or indirect access to non-volatile storage on the same customer premises. Example of end node devices that can support the provider-content server include desktop and laptop personal computers, digital video recorders (DVRs) and game consoles, such as the Play Station from Sony Corporation of America of New York City, N.Y., the Game cube of Nintendo of America of Redmond, Wash. and the XBOX of Microsoft Corporation, of Redmond Wash. Straightforward modifications of other devices can also create platforms suitable for executing the provider-content servers on intermediate network nodes including at customer edge nodes (CEs). For example, in some such modifications, an internal or external hard disk for non-volatile storage is added on intermediate network node devices with processors and network interfaces, such as routers, cable modems and cable set top boxes.

3.1 Method at Provider-Content Server on Customer Premises

In step 202 policy data is received that indicates how provider content is to be received and redistributed by the provider-content server. Any method may be used to receive the data, including, but not limited to predefined data stored within source code or in files stored with executable code ("default values") or in files or a database accessible to the process, manual input either in response to prompts from the process or independently of prompts, or from data included in a message sent to the server by another server or from a client process, such as in one or more messages received from content manager 132.

In some embodiments, the policy data indicates that the provider-content server is to function as an archival site for the provider. For example, in some embodiments of the archival site function, the customer premises node receives unsolicited provider content from the service provider, and retains storage of the provider content indefinitely for responding to requests from other customer premises nodes. In many embodiments of the archival functions, the customer premises node is not authorized to delete the unsolicited provider content without a further message from the service provider or, at least, notification to the service provider of the deletion. In this way, the service provider can salt away rarely used content on one or more customer premises nodes. Because there are many customer premises nodes in communication with each service provider, a substantial amount of rarely used content can be stored at little expense to the service provider. Thus the service provider can offer more rare content than a service provider without the capacity to use customer premises nodes to store the rare data.

In some embodiments, the policy data indicates that the provider-content server is to function as a provider-seeded site for provider content that is to be later distributed to one or more customer premises nodes that may or may not request the provider content. For example, in some embodiments of the seeded site function, the customer premises node receives unsolicited provider content from the service provider, and retains storage of the provider content for unsolicited distribution to other customer premises nodes at a particular time. In this way a pre-recorded broadcast can be seeded to one customer premises node on each last mile segment of a HFC access network as background traffic over many hours before a scheduled broadcast. At the appointed time, the customer premises nodes broadcast the content to their last mile segment, whereupon that content reaches all the other customer premises edge nodes that tap into the same cable, e.g., CEs 150a, 150b, 150c tapped into cable 163. In some embodiments, to protect unauthorized distribution before the appointed time, the content is encrypted, and the decryption key is distributed at the appointed time. Thus the consumption of network resources is greatly reduced at the time of the broadcast, when otherwise network traffic on access network 110c between distribution hub 112 and access modules 152 would be very heavy. In some embodiments, during staggered broadcasts, such as broadcasts based on time zones of receivers, the content is seeded during the earlier broadcast for the receivers of the later broadcast. In some embodiments, pre-ordering by receivers is used to determine which customer premises equipment to seed.

In some embodiments, the policy data indicates that the provider-content server is to function as a demand site for provider content that is initially requested by one or more customer premises nodes. For example, in some embodiments of the demand site function, the customer premises node requests the provider content for its own use, but retains storage of the provider content even after its own use for responding to requests from other customer premises nodes. In some embodiments of the demand site function, the customer premises node monitors requests from other customer premises nodes on the same last mile network and either stores the provider content sent in response or measures the demand for provider content already stored. The customer premises node retains storage of the most demanded provider content for responding to requests from other customer premises nodes. The customer premises node response to such requests in any way known in the art. For example, the customer premises node advertises the provider content it is storing and sends that content in response to requests as in peer-to-peer file sharing systems like BIT TORRENT™ of BitTorrent Inc. of San Francisco, Calif.

When storage space on the customer premises node becomes limiting, the provider content associated with the highest demand is kept and provider content with lower demand is deleted—at the discretion of the local provider-content server (e.g., provider-content server 134a) rather than at the discretion of the content manager (e.g., content manager 132).

In step 210, provider content data is received at the provider-content server. The content is received either in one or more data packets directed to the provider-content server or its customer premises node host, or in data packets directed to another customer premises node, which data packets are snooped by the provider-content server by virtue of the tap point (e.g., tap point 164a) on the same last mile link (e.g., cable 163) as the other customer premises node. In some embodiments, the provider content data is received with additional data that associates with the provider content data an archival flag that indicates an archival function, or an expiration date for deleting the provider content from storage, or release conditions that indicates when this content is to be re-distributed to one or more other customer premises nodes, or some combination.

In step 220, it is determined whether conditions are satisfied for storing the provider content data. In some embodiments, the conditions for storing are determined by the software installed. In some embodiments, the conditions for storing are based at least in part on the policy data received in step 202.

For example, in some embodiments of the demand site function, only provider content requested by the customer premises node that hosts the provider-content server satisfies conditions for storing. In some embodiments of the demand site function, any provider content snooped on the last mile segment by the customer premises node that hosts the provider-content server satisfies conditions for storing. In some embodiments of the archival site function, unsolicited provider content directed to the customer premises node that hosts the provider-content server and marked for archival also satisfies conditions for storing. In some embodiments, the content is marked for archival by an archival flag associated with provider content received in step 210. In some embodiments of the seeding site function, unsolicited provider content directed to the customer premises node that hosts the provider-content server and including data that indicates when the content is to be redistributed also satisfies conditions for storing.

In some embodiments, step 220 includes determining whether there is storage space for the provider content. If there is sufficient storage space, the provider content still satisfies conditions for storing. If not, then storage depends on whether provider content already stored is of lesser worth than the newly received provider content. In such embodiments, step 220 includes determining whether the worth of the recently received provider content is greater than the worth of the provider content already stored. Any method may be used to determine worth. In various embodiments, worth depends on the number of requests for the content, or the priority of the content, or the timeliness of the content, or some other quantifiable property of the content, or some combination, whether detected by the provider-content server or the service provider and received along with the provider content received, or both.

If it is determined in step 220 that conditions for storing the provider content are not satisfied, control passes to step 222 to perform normal processing. For example, the provider content is output to a television set or computer display for presentation to a viewer. Control then passes to step 250 to determine whether to retrieve and send any previously recorded provider content data, described in more detail below.

If it is determined in step 220 that conditions for storing the provider content are satisfied, control passes to step 230. In step 230, it is determined whether conditions are satisfied for deleting provider content data previously stored. In some embodiments, the conditions for deleting are determined by the software installed. In some embodiments, the conditions for deleting are based at least in part on the policy data received in step 202. For example, the conditions for deleting are based on a maximum age provided by the policy data.

In some embodiments, it is determined during step 230 whether there is insufficient storage space to store provider content that has higher worth than provider content already stored. In some embodiments, it is determined during step 230, whether an age of provider content data already stored exceeds a maximum age for storing that data associated with the content data or dictated by policy data received in step 202. In some embodiments, it is determined during step 230, whether a current time follows an expiration date associated with the content data. In some embodiments, it is determined during step 230 whether a message is received from the service provider to delete archived data. In some embodiments, such a message is indicated by the archival flag associated with provider content received in step 210. In some embodiments, step 230 includes sending a request to the service provider, such as to the content manager process 132, to grant permission to delete provider content already stored at the customer premises node that hosts the provider-content server; and receiving a response, and determining whether to delete provider content based on the response.

If it is determined in step 230 to delete provider content data previously stored, control then passes to step 232. In step 232, provider content data previously stored is deleted. Control then passes to step 240 to store provider content. If it is determined in step 230 to not delete provider content data previously stored, control then passes directly to step 240.

In step 240, the provider content data is stored on non-volatile storage local to the customer premises node that hosts the provider-content server. The provider content data may be stored in any manner known in the art. In some embodiments, the provider content data is first compressed to take less storage space and then the compressed data is stored. Control then passes to step 250.

According to some embodiments, when content is recorded during step 240, the recording is also advertised to some "list server" or "magnet site" entity that is responsible for helping other provider content servers locate provider content. The list server function is provided by the content manager 132 in the illustrated embodiment, as described in more detail below. In other embodiments, the list server is a separate server, e.g., a cable modem termination system (CMTS) on access module 152, or a content server in each neighborhood (e.g., a designated provider content server on customer premises equipment). In some embodiments, multiple list servers in a hierarchy store the associations between content servers and content. It is then possible for another customer premises provider content server to consult this 'list' and download the list from its closest source. In some embodiments, the identity or address of the list server is included in the policy data received during step 202, described above.

In some embodiments, the selection of a content server from which to request content, such as a content server identified in the list form the list server, depends on a quality of service that can be expected from that content server to the requesting node. For example, statistics of congestion and load at different content servers are used to estimate download performance across the cable network in comparison to other sources of the content, such as the hubs, or other sources on the list. Similarly, proximity to the content server is considered in some embodiments. More localized download are usually more efficient uses of network resources. For example, if one site has 2 DVRs, and a first records some content, then when a request is made by the other, the list indicates the content is already on the requester's local network. The request is then directed just to the first DVR, efficiently downloaded from that DVR, and other content servers are not consumed with supplying the content.

In step 250, it is determined whether conditions are satisfied for sending provider content data previously stored. In some embodiments, the conditions for sending are determined by the software installed. In some embodiments, the conditions for sending are based at least in part on the policy data received in step 202. For example, the conditions for sending include some conditions for sending a broadcast on a network segment, some conditions for sending a unicast to a particular customer premises node that requests the data, or both; and are provided by the policy data.

In some embodiments, during step 250 it is determined whether a request is snooped on last mile network through the network connection with the provider network, and whether the requested provider content resides in local storage, and whether the content provider server is to provide data to all received requests no matter where directed. For example, in some embodiments, it is determined at end node 120*a* executing provider-content server 134, that a request passing tap point 164*a* on cable 163 is sent (in both directions) from CPE 150*b* requesting a particular video program and that the particular video program is indeed stored locally on end node 120*a* and that server 134*a* is to respond to all requests. Therefore it is determined that conditions are satisfied for sending the particular provider content to CE 150*b*. Note that it is not required that CE 150*b* have a provider-content server 134*a* executing. Any conventional request for provider data can be answered by provider-content server 134*a*. In embodiments in which server 134 is only to respond to requests directed solely to server 134*a*, then conditions are not satisfied for sending the particular data based on snooping a request.

In some embodiments, during step 250 it is determined whether a request is directed to the provider-content server for particular provider content and whether the requested provider content resides in local storage and whether the content provider server is to provide data to all requests directed to the server. For example, in some embodiments, it is determined at end node 120*a* executing provider-content server 134*a*, that a request is directed to provider-content server 134*a* that a particular video program be sent to a particular customer premises equipment on a different last mile network than cable 163. If it is determined that the particular video program is indeed stored locally on end node 120*a*, then it is determined that conditions are satisfied for sending the particular provider content to CE 150*b*. Note that it is not required that the requesting customer premises node have a provider-content server 134 executing. Any conventional request for provider data can be answered by provider-content server 134. In an illustrated embodiment, a content server on the requesting node utilizes a query to a list server, such as content manager 132, to determine the content server from which to request the particular content.

In some embodiments, during step 250 it is determined whether an appointed time has arrived when seeded provider content data that is stored locally is to be released. In some embodiments, during step 250 it is determined whether a decryption key has been received at the provider-content server for seeded encrypted provider content data that is stored locally.

If the particular provider content is not stored locally at provider-content server, then conditions are not satisfied for sending the provider content.

If it is determined in step 250 that conditions are not satisfied for sending provider content data, control passes back to step 210 to deal with any further provider content data that is received. If none is received in a reasonable time control passes back to step 250 to see if conditions are presently satisfied for sending provider content data.

If it is determined in step 250 that conditions are satisfied for sending provider content data, control passes to step 260. In step 260, provider data stored locally on non-volatile storage is retrieved and sent to another customer premises node. Any method may be used to send the data. In some embodiments, compressed data is retrieved and sent to the other customer premises node. In some embodiments, uncompressed data is retrieved and sent to the other customer premises node. In some embodiments, compressed data is retrieved, the uncompressed provider content data is reconstituted, and the uncompressed provider content data is sent send to the other customer premises node.

In some embodiments, a message is sent to the service provider network (e.g., to provider content distribution sever 112) that the request has been answered by the provider-content server 134. In response to receiving this message, the service provider does not further respond to the request. For example, the provider content distribution hub 112 receives data that indicates the provider content requested by CE 150*b* is being satisfied by end node 120*a*. Thus the provider content distribution hub 112 does not also respond by sending the requested provider content data.

The Data Over Cable Service Interface Specification (DOCSIS) defines interface standards for cable modems and supporting equipment. Other devices that recognize and support DOCSIS include HDTV and web-enabled STBs for regular television. DOCSIS specifies downstream (service provider network to CE) traffic transfer rates between 27 and 26 million bits per second (Megabits per second, Mbps, where a bit is a binary digit) over a radio frequency (RF) channel in the range from 50 million cycles per second (MegaHertz, MHz) to over 750 MHz. Upstream (CE to service provider network) traffic rates lie between 0.32 Mbps and 10 Mbps over a RF channel in the range from 5 MHz to 42 MHz.

In some embodiments, a new frequency is allocated as an extra channel for sharing CE to CE traffic. By using the extra channel, the customer does not see the Internet connection bandwidth affected.

In some embodiments, a broadcast over a network segment is not possible and the content must be sent in a point to point data packet. For example, in some DSL last mile networks, one customer premises node can not send data packets directly to another customer premises node on the same segment. In such embodiments, the data can be sent to the access module, e.g., a DSLAM at the end of the segment and the DSLAM can forward the packet to the destination node. Although this causes two data packets to be sent over the last mile, it still saves traffic on the upstream access network 110c.

After step 260, control then passes back to step 210 to deal with any further provider content data that is received. If none is received in a reasonable time control passes back to step 250 to see if conditions are presently satisfied for sending provider content data.

3.2 Method at Content Manager on Service Provider Network

In some embodiments, the provider-content servers (e.g., server 134) operate as peers and store any data received that outranks data already in storage, as ranked by demand or other measure of worth, and respond to all requests for data that is stored. In some such embodiments, there is need for a content manager (e.g., content manager 132) to function as list server that allows one peer to find another peer. In other embodiments with content servers 134 behaving as peers, there is no need for a content manager (e.g., content manager 132) on the service provider network. In embodiments that include archival and seeding functions, however, a content manager is usually involved.

FIG. 3 is a flow diagram that illustrates at a high level a method 300 for a content manager (e.g., content manager 132) that resides in the service provider network and that orchestrates content servers on customer premises node, according to an embodiment.

In step 302, content policy data is received. Any method may be used to receive the data, as described above. In one embodiment, step 302 includes receiving a file of computer instructions that serves as a computer program that implements the content policy, including some combination of peer to peer demand, archival and seeding functions. In some embodiments, values for certain policy parameters are received during step 302. For example, the maximum age to keep stored provider content data is received in step 302.

In step 310 data is received that indicates one or more customer premises nodes that will host provider-content servers. Any method may be used to receive the host data. It is recognized that not every customer will agree to use the resources of that customer's equipment to support the distribution of provider content. Processor, disk and bandwidth resources may be scarce in the customer's view. For example, in some embodiments, the customer of site 102 agrees to use only node 120a as a host for the provider-content server but not node 120b or CE 150a. Similarly, the customer on whose premises CE 150c resides, may not agree to use that node to execute a provider-content server; or the CE 150c may not have permanent storage and therefore not be suitable as a host for the provider-content server.

To address the concerns of CPU utilization and disk space, a few approaches are possible. First, for a provider-managed device, such as a set-top box or modem, the customer may be simply unaware that this is occurring. Furthermore, in some embodiments, an equipment leasing contract is structured to allow provider-managed CEs to be used for a provider-content server. Second, for non-provider-managed CEs such as PCs and DVRs, the user would likely at least be aware that content sharing is occurring and special software would likely be installed. In various embodiments, a market-based system of one or more incentives is offered. For example, the service provider offers a faster response to customer requests for content, if the customer agrees to share certain amount of hard disk space. The offer is feasible, because its acceptance increases the likelihood that a customer will have available the customer's neighbors' caching servers to speed the response. In some embodiments the one or more incentives include money, e.g., by awarding credits for larger, more relevant caching of the provider's content for other customers.

To address the concerns of bandwidth, other approaches are possible. In some embodiments, a new DOCSIS frequency is allocated as an extra channel for sharing CE to CE traffic, as described above. In some embodiments, well known IP-based bandwidth reservation methods are used, alone or in combination with the extra DOCSIS channel.

In some embodiments, step 310 is performed by sending a message, such as a Web form, to the customer and receiving data indicating a response from the customer. In some embodiments, the customer communicates verbally with a customer service representative of the service provider, and an administrator for the service provider manually inputs the information about the node to serve as host.

In step 320, provider-content server software is installed on the nodes determined in step 310 to be hosts. In some embodiments, the software is installed outside the control of the content manager, e.g., manually by the customer or by a customer service representative, and step 320 is omitted.

In step 322, provider-content policy data is sent to the provider-content servers on the nodes identified in step 310. Any method may be used to send this data. For example, in some embodiments a message is sent in a broadcast or unicast to one or more provider-content servers with data that indicates values of one or more parameters that describe the caching, distribution or retention policy, or some combination, to be implemented.

In step 330, it is determined whether conditions are satisfied for archiving provider content. Any method may be used to determine whether such conditions are satisfied. In some embodiments, the content manger determines a set of content data that is rarely used and distributes that content among all available provider-content servers, with some duplication to provide protection against lost data, should an archiving node fail. If one archiving node fails, conditions are satisfied for archiving a duplicate copy of the content. In some embodiments, step 330 includes successively polling all provider-content servers on customer premises nodes to ensure that they are still functioning as an archive for their content. The polling rate can be low enough, e.g., one server per minute, so as not to burden the content manger or the provider network. In some embodiments, step 330 includes receiving status messages from all provider-content servers on customer premises nodes to ensure that they are still functioning as an archive for their content. Similarly, the reporting rate can be low enough, e.g., once per week per customer premises node hosting a provider-content server, so as not to burden the content manger or the provider network. In embodiments that do not include an archiving function, step 330 is omitted, and control passes directly to step 340.

If it is determined in step 330 that conditions are satisfied for archiving content to customer premises nodes, control passes to step 332. In step 332, the provider content to be archived is sent to one or more provider-content servers along with an archival flag that includes data that indicates the content should be archived in the local non-volatile storage for that server. Archival storage indicates that the content should be retained at the customer premises node until failure of the node or further instructions from the content manager, whichever comes first. Control then passes to step 310 to receive additional data indicating customer premises nodes that are joining or departing the set of nodes that support provider-content servers. If no such data is received in a reasonable time, control passes back to step 330 and following to see if conditions are satisfied for sending content to one or more provider-content servers.

In step 340, it is determined whether conditions are satisfied for seeding provider content. Any method may be used to determine whether such conditions are satisfied. In some embodiments, the content manger determines whether there is some particular pre-recorded provider content data that is to be widely distributed in a small time window. Examples of such content include a broadcast television movie or an opinion website to be visited in response to a broadcast. To reduce provider network congestion during that small time window, the service provider prefers to seed the content onto customer premises nodes that support a provider-content server gradually over a time interval that is long compared to the small time window and that occurs before the beginning of the small time window. For example, the content is to be seeded on one customer premises node on each segment of the last mile network, e.g., onto CPE 150b during a time interval 24 hours long preceding the time of the broadcast. In embodiments that do not include a seeding function, step 340 is omitted, and control passes directly to step 350.

If it is determined in step 340 that conditions are satisfied for seeding content to customer premises nodes, control passes to step 342. In step 342, the provider content to be seeded is sent to one or more provider-content servers along with release data that indicates when and to whom the content should be released. Seeded storage indicates that the content should be retained at the customer premises node until distributed and may be then deleted. Any combination of time and destination for the content may be indicated.

For example, in an illustrated embodiment, content that represents the particular movie is sent to the first customer premises node that hosts a provider-content server on each last mile cable connected to a fiber node access module, e.g., to CE 150b on cable 163 connected to access module 162 in FIG. 1B within a particular time zone. The release data in the illustrated embodiment indicates the content should be broadcast onto cable 163 when a decryption key is received. In such embodiments, step 342 includes sending the decryption key to the same customer premises nodes at the desired time. In some embodiments, the recipients of the content are only certain subscribers, so instead of a broadcast, the release data indicates that the content is to be sent in a multicast or unicast only to certain customer premises nodes, such as a list of IP addresses on the same last mile network segment. In some embodiments, the release data indicates that the content should be broadcast, multicast or unicast onto cable 163 at a particular time. Control then passes to step 310 to receive additional data indicating customer premises nodes that will join or depart the set of nodes that support provider-content servers. If no such data is received in a reasonable time, control passes back to step 330 and following to see if conditions are satisfied for sending content to one or more provider-content servers.

In step 350, it is determined whether conditions are satisfied for responding to a request from a provider-content server on a customer premises node. Any method may be used to determine whether such conditions are satisfied. In an illustrated embodiment, it is determined during step 350 whether the requested content is already stored at one or more customer premises nodes closer to the requester than the head end (e.g., end node 120d) or a distribution hub on the provider network (e.g., distribution hub server 112). In some embodiments step 350 is omitted, and control passes directly to step 310, and after a reasonable time to step 330 and following. For example, in some embodiments, all requests that can be answered by a provider-content server on the path from the requester to the content manager are answered and the request is not forwarded or another message is sent indicating that the request has already been answered. Therefore all requests that arrive unanswered at the content manager 132 are answered by a provider network distribution hub and not a provider-content server on a customer premises node. In some embodiments step 350 includes receiving a request from a provider content server for a list of the content on customer premises nodes, or the name of a provider content server (or nearest provider content server to the requestor) from which the content can be requested.

If it is determined in step 350 that conditions are satisfied for responding to a request at a provider-content server on a customer premises node, control passes to step 352. In step 352, a response is sent for the request. For example, in some embodiments, the list of content servers' names or addresses associated with different content is sent to the requestor. In some embodiments, the request information is sent to the provider-content server that stores the requested provider content on one of the closer customer premise nodes. The request information is typically much less than the provider content requested and therefore forwarding the request information make a negligible impact on network resources. For example, a request from a customer premises node behind access module 152b for data stored on CE 150b is not seen and therefore not answered by CE 150b. Instead the request is forwarded from access module 152b to the network service provider, e.g., to provider content distribution hub 112. There the content manger 132 determines that the requested content is stored at CE 150b. During step 352, the content manger 132 forwards the request to provider-content server 134b on CE 150b. Provider-content server 134b then sends the content to the requesting node, as described above for step 250. The content is sent as a unicast (e.g., using IP) because a broadcast on the last mile network 110b segment does not reach the requesting node behind access module 152b. Control then passes back to step 310, and if no host data is received in a reasonable time, control passes to step 330 and following to see if conditions are satisfied for sending content to one or more provider-content servers.

If it is determined in step 350 that conditions are not satisfied for responding to a request at a provider-content server on a customer premises node, then control passes to step 354. In step 354, a service provider network node, such as head end node 120d or distribution hub server 112, provides the content. In step 354, that provider node is caused to send the content. For example, a message is sent to distribution hub server 112 to send the content to the requesting customer premises node.

To set up one or more customer premises nodes to respond to future requests for the same content, during step 354, the content manager determines whether the requesting node has a provider-content server. If so, nothing further is done by the manger 132; because, when the customer node receives the content, its provider-content server 134 will store the content provided the available space is available with lower valued content. However, if it is determined that the requesting customer node does not have a provider-content server, then the content manger determines a particular provider-content server on a customer premises node (CPN) close to the requesting node, and sends the content also to that particular provider-customer server. For example, if the content is requested by end node 120b, the content manager 132 also causes the content to be sent to end node 120a that hosts provider-content server 134a.

After step 354, control then passes back to step 310, and if no host data is received in a reasonable time, control passes to step 330 and following to see if conditions are satisfied for sending content to one or more provider-content servers.

Using the methods 200 and 300 described above, the service provider causes one or more customer premises nodes to become content caches for neighboring customer premises nodes.

4.0 Implementation Mechanisms—Hardware Overview

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

The term computer-readable medium is used herein to refer to any medium that participates in providing information to processor 402, including instructions for execution. Such a medium may take many forms, including, but not limited to, non-volatile media, and/or volatile media. Non-volatile media include, for example, optical or magnetic disks, such as storage device 408. Volatile media include, for example, dynamic memory 404.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, or any other medium from which a computer can read.

Information, including instructions, is provided to the bus 410 for use by the processor from an external terminal 412, such as a terminal with a keyboard containing alphanumeric keys operated by a human user, or a sensor. A sensor detects conditions in its vicinity and transforms those detections into signals compatible with the signals used to represent information in computer system 400. Other external components of terminal 412 coupled to bus 410, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 412. In some embodiments, terminal 412 is omitted.

Computer system 400 also includes one or more instances of a communications interface 470 coupled to bus 410. Communication interface 470 provides a two-way communication coupling to a variety of external devices that operate with their own processors, such as printers, scanners, external disks, and terminal 412. Firmware or software running in the computer system 400 provides a terminal interface or character-based command interface so that external commands can be given to the computer system. For example, communication interface 470 may be a parallel port or a serial port such as an RS-232 or RS-422 interface, or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 400 includes switching system 430 as special purpose hardware for switching information for flow over a network. Switching system 430 typically includes multiple communications interfaces, such as communications interface 470, for coupling to multiple other devices. In general, each coupling is with a network link 432 that is connected to another device in or attached to a network, such as local network 480 in the illustrated embodiment, to which a variety of external devices with their own processors are connected. In some embodiments an input interface or an output interface or both are linked to each of one or more external network elements. Although three network links 432a, 432b, 432c are included in network links 432 in the illustrated embodiment, in other embodiments, more or fewer links are connected to switching system 430. Network links 432 typically provides information communication through one or more networks to other devices that use or process the information. For example, network link 432b may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides routing information for use with switching system 430.

The switching system 430 includes logic and circuitry configured to perform switching functions associated with passing information among elements of network 480, including passing information received along one network link, e.g. 432a, as output on the same or different network link, e.g., 432c. The switching system 430 switches information traffic arriving on an input interface to an output interface according to pre-determined protocols and conventions that are well known. In some embodiments, switching system 430 includes its own processor and memory to perform some of the switching functions in software. In some embodiments, switching system 430 relies on processor 402, memory 404, ROM 406, storage 408, or some combination, to perform one or more switching functions in software. For example, switching system 430, in cooperation with processor 404 implementing a particular protocol, can determine a destination of a packet of data arriving on input interface on link 432a and send it to the correct destination using output interface on link 432c. The destinations may include host 482, server 492, other terminal devices connected to local network 480 or Internet 490, or other routing and switching devices in local network 480 or Internet 490.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420 and circuits in switching system 430, may be used in place of or in combination with software to implement the invention. Thus, embodiments of the invention are not limited to any specific combination of hardware and software.

The signals transmitted over network link 432 and other networks through communications interfaces such as interface 470, which carry information to and from computer system 400, are exemplary forms of carrier waves. Computer system 400 can send and receive information, including program code, through the networks 480, 490 among others, through network links 432 and communications interfaces such as interface 470. In an example using the Internet 490, a server 492 transmits program code for a particular application, requested by a message sent from computer 400, through Internet 490, ISP equipment 484, local network 480 and network link 432b through communications interface in switching system 430. The received code may be executed by processor 402 or switching system 430 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 432b. An infrared detector serving as communications interface in switching system 430 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402 or switching system 430.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. One or more physical, non-transitory computer readable storage media encoded with software comprising computer executable instructions and when the software is executed operable to:
receive unsolicited content from a digital content provider including policy data comprising release data indicating that the content is to be broadcast, multicast or unicast at a particular time;
store digital content provider data in non-volatile storage based on the unsolicited content on a first customer premises node in a last-mile network;
determine whether conditions are satisfied to release the digital content for sending the provider digital content data to a second customer premises node in the same last-mile network, in response to determining that the conditions are satisfied for sending the provider digital content data;
retrieve the provider data from the non-volatile storage, wherein the provider data is encrypted;
send the provider data from the first customer premises node to the second customer premises node in the same last-mile network; and
distribute a decryption key to the second customer premises node at the particular time.

2. The one or more computer readable storage media of claim 1, wherein the first customer premises node is not authorized to delete the provider data.

3. The one or more computer readable storage media of claim 1, wherein the first customer premises node is not authorized to delete the provider data without sending a notice to the service provider of such deletion.

4. The one or more computer readable storage media of claim 1, wherein when the software is executed is further operable to receive second content that is to be distributed on demand.

5. The one or more computer readable storage media of claim 4 wherein the second content is received responsive to a request for the content.

6. The one or more computer readable storage media of claim 1 wherein the second content is received from a different customer premises node.

7. The one or more computer readable storage media of claim 1, wherein the first customer premises node and the second customer premises node are respective end nodes in the last-mile network.

8. A method comprising:
receive provider content policy data associated with provider content;
receiving customer data that identifies a customer set of one or more customer premises nodes (CPNs) in a last-mile network and configured for hosting the provider content;
sending instructions for hosting and serving the provider content to the customer set;
sending the provider content policy data to the customer set;
determine if conditions are satisfied at one or more CPNs of the customer set for archiving the provider content, wherein if the conditions are satisfied for archiving then sending the provider content and an archival flag to the one or more CPNs of the customer set, wherein the provider content is to be archived;
determine if the conditions are satisfied at one or more CPNs for the seeding content, wherein if the conditions are satisfied for seeding the provider content then sending the provider content and release conditions to the one or more CPNs of the customer set, wherein the provider content and the release conditions are to be stored on the one or more CPNs of the customer set;
determine if conditions are satisfied at one or more CPNs of the customer set for responding to a request for the provider content; and
sending a message, to a requesting CPN in the same last-mile network, identifying the one or more CPNs satisfying the conditions for responding to the request, enabling the requesting CPN in the same last-mile network to obtain the provider content from the one or more CPNs identified in the message.

9. The method of claim 8, wherein the policy data includes provider rules governing the maximum age to keep stored provider content data, peer to peer demand, archival and seeding functions, or combinations thereof.

10. The method of claim 8, further comprising sending archiving instructions to the one or more CPNs of the customer set satisfying the conditions for archiving, wherein the archiving instructions identify that the provider content is to be archived until failure of the corresponding node or further instructions from a content manager are received.

11. The method of claim 8, wherein seed provider content comprises pre-recorded programming that is to be widely distributed in a small time window.

12. The method of claim 8, wherein the release data identifies authorized receivers for the seeded provider content and when provider content should be released.

13. The method of claim 8, further comprising determining if the requested provider content is already stored at one or more CPNs in the customer set closer in proximity to the requester than the than a provider or a distribution hub on the provider network.

14. The method of claim 8, wherein the one or more CPNs identified in the message and the requesting CPN are respective end nodes in the last-mile network.

15. An apparatus comprising:
one or more processors; and
a memory coupled to the one or more processors comprising instructions executable by the processors, the processors when executing the instructions configured to:
receive unsolicited content from a digital content provider comprising release data, the release data indicating that content is to be broadcast, multicast or unicast at a particular time;
store digital content provider data in non-volatile storage based on the unsolicited content on a first customer premises node in a last-mile network, wherein the first customer premises node is not authorized to delete the provider data;
determine whether conditions are satisfied to release the digital content for sending the provider digital content data to a second customer premises node in the same last-mile network;
in response to determining that the conditions are satisfied for sending the provider digital content data:
retrieve the provider data from the non-volatile storage, wherein the provider data is encrypted; and
send the provider data from the first customer premises node to the second customer premises node; and
distribute a decryption key to the second customer premises node at the particular time.

16. The apparatus of claim 15 wherein the first customer premises node is not authorized to delete the provider data.

17. The apparatus of claim 15 wherein the first customer premises node is not authorized to delete the provider data without sending a notice to the service provider of such deletion.

18. The apparatus of claim 15 wherein when the software is executed is further operable to receive second content that is to be distributed on demand.

19. The apparatus of claim 15 wherein the second content is received from a different customer premises node.

20. The apparatus of claim 15, wherein the first customer premises node and the second customer premises node are respective end nodes in the last-mile network.

* * * * *